US009801010B2

(12) United States Patent
Yuan et al.

(10) Patent No.: US 9,801,010 B2
(45) Date of Patent: Oct. 24, 2017

(54) ZIGBEE NETWORK-BASED DATA TRANSMISSION METHOD, APPARATUS, AND SYSTEM

(71) Applicant: Huawei Technologies Co., Ltd., Shenzhen (CN)

(72) Inventors: Shurui Yuan, Nanjing (CN); Juncheng Zhang, Nanjing (CN); Jinbo Zhang, Nanjing (CN); Junyang Rao, Nanjing (CN)

(73) Assignee: HUAWEI TECHNOLOGIES CO., LTD., SHENZHEN (CN)

( * ) Notice: Subject to any disclaimer, the term of this patent is extended or adjusted under 35 U.S.C. 154(b) by 0 days.

(21) Appl. No.: 15/087,046

(22) Filed: Mar. 31, 2016

(65) Prior Publication Data
US 2016/0295355 A1    Oct. 6, 2016

(30) Foreign Application Priority Data
Mar. 31, 2015   (CN) .......................... 2015 1 0147705

(51) Int. Cl.
*H04W 36/06* (2009.01)
*H04W 4/00* (2009.01)
(Continued)

(52) U.S. Cl.
CPC .......... *H04W 4/008* (2013.01); *H04W 36/06* (2013.01); *H04W 40/00* (2013.01); *H04W 84/18* (2013.01)

(58) Field of Classification Search
CPC .................................................. H04W 40/00
See application file for complete search history.

(56) References Cited

U.S. PATENT DOCUMENTS

| 2011/0136433 A1* | 6/2011 | Tsai | H04W 88/10 |
| | | | 455/41.2 |
| 2012/0099587 A1* | 4/2012 | Fan | H04W 40/16 |
| | | | 370/389 |

(Continued)

FOREIGN PATENT DOCUMENTS

| WO | 2008090524 A2 | 7/2008 |
| WO | 2009067352 A1 | 5/2009 |

OTHER PUBLICATIONS

Gao, M., et al., "ZigBee Wireless Mesh Networks for Remote Monitoring System of Pumping Unit," Proceedings of the 7th World Congress on Intelligent Control and Automation, Jun. 25-27, 2008, 5 pages.

(Continued)

*Primary Examiner* — David Bilodeau
(74) *Attorney, Agent, or Firm* — Conley Rose, P.C.

(57) ABSTRACT

A ZIGBEE network-based data transmission method used to resolve a problem, that when a ZIGBEE network to which interference is relatively large is used to perform data transmission, a relatively low success rate of data transmission may be caused. The method includes, when detecting that a current working channel is interfered, acquiring, by a first routing node, interference energy intensities of remaining channels, determining that channels whose interference energy intensities are less than a first threshold are available switching channels, and sending a channel report message to an upper-layer routing node, where the channel report message includes all available switching channels, receiving a channel switching message sent by the upper-layer routing node, and switching to a target switching channel indicated by the channel switching message and receiving data using the target switching channel.

14 Claims, 4 Drawing Sheets

(51) Int. Cl.
H04W 40/00 (2009.01)
H04W 84/18 (2009.01)

(56) References Cited

U.S. PATENT DOCUMENTS

| | | | |
|---|---|---|---|
| 2014/0048522 A1* | 2/2014 | Dina | H04W 4/005 |
| | | | 219/132 |
| 2014/0226672 A1* | 8/2014 | Zou | H04W 36/06 |
| | | | 370/400 |
| 2015/0030011 A1* | 1/2015 | Liu | H04L 1/1893 |
| | | | 370/336 |
| 2016/0037365 A1* | 2/2016 | Makrakis | H04L 1/1825 |
| | | | 370/252 |
| 2016/0295355 A1* | 10/2016 | Yuan | H04W 4/008 |

OTHER PUBLICATIONS

Xu, R., et al., "MuZi: Multi-channel Zigbee Networks for Avoiding WiFi Interference," IEEE International Conferences on Internet of Things, and Cyber, Physical and Social Computing, Oct. 19, 2011, 7 pages.
Foreign Communication From a Counterpart Application, European Application No. 16161352.6, Extended European Search Report dated Sep. 5, 2016, 10 pages.
"Part 15.4: Wireless Medium Access Control (MAC) and Physical Layer (PHY) Specifications for Low-Rate Wireless Personal Area Networks (WPANs)," IEEE Std 802.15.4, Sep. 8, 2006, 323 pages.

* cited by examiner

Terminal device

FIG. 1

| When a first routing node detects that a current working channel of the first routing node is interfered, the first routing node acquires interference energy intensities of remaining channels, and determines that channels, whose interference energy intensities are less than a first threshold, in the remaining channels are available switching channels of the first routing node | 201 |

| The first routing node sends a first channel reporting message to a second routing node, where the first channel reporting message includes the available switching channels of the first routing node, and the second routing node is an upper-layer routing node of the first routing node | 202 |

| The first routing node receives a first channel switching message sent by the second routing node, where the first channel switching message includes a first target switching channel that is determined by the second routing node for the first routing node | 203 |

| Switch the first routing node to the first target switching channel, and receive data by using the first target switching channel | 204 |

ZIGBEE NETWORK-BASED DATA TRANSMISSION METHOD, APPARATUS, AND SYSTEM

CROSS-REFERENCE TO RELATED APPLICATION

This application claims priority to Chinese Patent Application No. 201510147705.0, filed on Mar. 31, 2015, which is hereby incorporated by reference in its entirety.

TECHNICAL FIELD

The present disclosure relates to the field of data processing, and in particular, to a ZIGBEE network-based data transmission method, apparatus, and system.

BACKGROUND

A ZIGBEE technology is a short-range two-way wireless communications technology that has low power consumption, and has features, such as a short range, low complexity, self-organization, and low power consumption. The ZIGBEE technology works in a 2.4 gigahertz (GHz) frequency band, and divides 2.4 GHz into 16 working channels. A network formed using the ZIGBEE technology is referred to as a ZIGBEE network.

In a process of constructing the ZIGBEE network, after a ZIGBEE coordinator is established, the ZIGBEE coordinator first performs energy detection scanning and active scanning, and selects, from the 16 available working channels, a channel to which interference is the smallest. Then, the ZIGBEE coordinator determines a 16-bit network address of the ZIGBEE coordinator, a personal area network (PAN) identity (ID) on the selected channel, another network topology parameter, and the like. After the foregoing parameters are selected, the ZIGBEE coordinator can allow another ZIGBEE device to be added to the network. A successfully constructed ZIGBEE network can be used to perform short-range data transmission, for example, metering on residents' meters and water meters and charging.

Even though in the process of constructing the ZIGBEE network, the ZIGBEE coordinator selects the channel to which interference is the smallest, for example, an idle channel or a channel for which networks are the fewest, because the frequency band of 2.4 GHz in which the ZIGBEE network works is also a working frequency band of technologies, such as wireless-fidelity (WI-FI) and BLUETOOTH, after the network is successfully constructed, a device using WI-FI and BLUETOOTH technologies may be newly added to the network, which therefore may interfere with the constructed ZIGBEE network. Currently, a method for effectively reducing interference is wanted, and if a ZIGBEE network to which interference is relatively large is used to perform data transmission, a relatively low success rate of data transmission may be caused.

SUMMARY

The present disclosure provides a ZIGBEE network-based data transmission method, apparatus, and system in order to resolve a problem in the prior art that when a ZIGBEE network to which interference is relatively large is used to perform data transmission, a relatively low success rate of data transmission may be caused.

To achieve the foregoing objective, the following technical solutions are used in the present disclosure.

According to a first aspect, the present disclosure provides a ZIGBEE network-based data transmission method, where the method includes, when a first routing node detects that a current working channel of the first routing node is interfered, acquiring, by the first routing node, interference energy intensities of remaining channels, and determining that channels, whose interference energy intensities are less than a first threshold, in the remaining channels are available switching channels of the first routing node, sending, by the first routing node, a first channel report message to a second routing node, where the first channel report message includes the available switching channels of the first routing node, and the second routing node is an upper-layer routing node of the first routing node, receiving, by the first routing node, a first channel switching message sent by the second routing node, where the first channel switching message includes a first target switching channel that is determined by the second routing node for the first routing node, and switching the first routing node to the first target switching channel, and receiving data using the first target switching channel.

With reference to the first aspect, in a first implementation manner of the first aspect, sending, by the first routing node, a first channel report message to a second routing node further includes querying, by the first routing node, a routing table, and acquiring a network address and a working channel of the second routing node, and switching the first routing node to the working channel of the second routing node, and sending the first channel report message to the second routing node according to the network address of the second routing node.

With reference to the first aspect or the first implementation manner of the first aspect, in a second implementation manner of the first aspect, the method further includes, if the first channel switching message is not received after preset duration, sending, by the first routing node, a search message using each channel, where the search message includes a network address and a working channel of the first routing node such that the second routing node returns a search response message according to the network address and the working channel of the first routing node, when the search response message returned by the second routing node is received, acquiring, by the first routing node, a current working channel of the second routing node from the search response message, and switching the first routing node to the current working channel of the second routing node, and sending the first channel report message to the second routing node again.

With reference to the first aspect, in a third implementation manner of the first aspect, the detecting, by a first routing node, that a current working channel of the first routing node is interfered includes comparing, by the first routing node, a data reading success rate with a second threshold, and when the data reading success rate is less than the second threshold, acquiring an interference energy intensity of the current working channel, where if the interference energy intensity is greater than a third threshold, the current working channel is interfered, and the data reading success rate is a ratio of a quantity of messages received by the first routing node to a quantity of messages sent by the first routing node within a preset time.

With reference to the first aspect, in a fourth implementation manner of the first aspect, the method further includes receiving, by the first routing node, a second channel report message sent by a third routing node, where the second channel report message includes available switching channels of the third routing node, and the third routing node is a lower-layer routing node of the first routing node, acquiring, by the first routing node, an interference energy intensity of each available switching channel of the available switching channels of the third routing node, and determining that a channel, whose interference energy intensity is the lowest, in the available switching channels of the third routing node is a second target switching channel of the third routing node, and sending, by the first routing node, a second channel switching message to the third routing node, where the second channel switching message includes the second target switching channel that is determined by the first routing node for the third routing node.

With reference to the fourth implementation manner of the first aspect, in a fifth implementation manner of the first aspect, acquiring, by the first routing node, an interference energy intensity of each available switching channel of the available switching channels of the third routing node, and determining that a channel, whose interference energy intensity is the lowest, in the available switching channels of the third routing node is a second target switching channel of the third routing node further includes, when the first routing node further receives a third channel report message of a fourth routing node, and common available channels that are the same as the available switching channels of the third routing node exist in available switching channels of the fourth routing node that are included in the third channel report message, acquiring interference energy intensities of the common available channels, and determining that a channel, whose interference energy intensity is the lowest, in the common available channels is the second target switching channel of the third routing node.

According to a second aspect, the present disclosure further provides a ZIGBEE network-based data transmission apparatus, where the apparatus includes a detection module configured to detect whether a current working channel of a first routing node is interfered, a processing module configured to, when it is detected that the current working channel of the first routing node is interfered, acquire interference energy intensities of remaining channels, and determine that channels, whose interference energy intensities are less than a first threshold, in the remaining channels are available switching channels of the first routing node, a transceiver module configured to send a first channel report message to a second routing node, where the first channel report message includes the available switching channels of the first routing node, and the second routing node is an upper-layer routing node of the first routing node, and receive a first channel switching message sent by the second routing node, where the first channel switching message includes a first target switching channel that is determined by the second routing node for the first routing node, and a switching module configured to switch the first routing node to the first target switching channel, where the transceiver module is further configured to receive data using the first target switching channel that is switched to by the switching module.

With reference to the second aspect, in a first implementation manner of the second aspect, the transceiver module is further configured to query a routing table, and acquire a network address and a working channel of the second routing node, and switch the first routing node to the working channel of the second routing node, and send the first channel report message to the second routing node according to the network address of the second routing node.

With reference to the second aspect or the first implementation manner of the second aspect, in a second implementation manner of the second aspect, the transceiver module is further configured to, when the first channel switching message is not received after preset duration, send a search message using each channel, where the search message includes a network address and a working channel of the first routing node such that the second routing node returns a search response message according to the network address and the working channel of the first routing node, when the search response message returned by the second routing node is received, acquire a current working channel of the second routing node from the search response message, and switch the first routing node to the current working channel of the second routing node, and send the first channel report message to the second routing node again.

With reference to the second aspect, in a third implementation manner of the second aspect, the transceiver module is further configured to receive a second channel report message sent by a third routing node, where the second channel report message includes available switching channels of the third routing node, and the third routing node is a lower-layer routing node of the first routing node, the processing module is further configured to acquire an interference energy intensity of each available switching channel of the available switching channels of the third routing node, and determine that a channel, whose interference energy intensity is the lowest, in the available switching channels of the third routing node is a second target switching channel of the third routing node, and the transceiver module is further configured to send a second channel switching message to the third routing node, where the second channel switching message includes the second target switching channel that is determined by the first routing node for the third routing node.

With reference to the third implementation manner of the second aspect, in a fourth implementation manner of the second aspect, the processing module is further configured to, when a third channel report message of a fourth routing node is received, and common available channels that are the same as the available switching channels of the third routing node exist in available switching channels of the fourth routing node that are included in the third channel report message, acquire interference energy intensities of the common available channels, and determine that a channel, whose interference energy intensity is the lowest, in the common available channels is the second target switching channel of the third routing node.

According to a third aspect, the present disclosure further provides a ZIGBEE network-based data transmission system, where the system includes an upper-layer routing node and a lower-layer routing node, where the lower-layer routing node is configured to, when detecting that a current working channel is interfered, acquire interference energy intensities of remaining channels, and determine that channels, whose interference energy intensities are less than a first threshold, in the remaining channels are available switching channels of the lower-layer routing node, and send a channel report message to the upper-layer routing node, where the channel report message includes the available switching channels of the lower-layer routing node. The upper-layer routing node is configured to receive the channel report message, acquire an interference energy intensity of each available switching channel of the available switching channels of the lower-layer routing node, and determine that a channel, whose interference energy intensity is the lowest, in the available switching channels of the lower-layer routing node is a target switching channel of the lower-layer routing node, and send a channel switching message to the lower-layer routing node, where the channel switching message includes the target switching channel that is determined by the upper-layer routing node for the lower-layer routing node, and the lower-layer routing node is further configured to receive the channel switching message, be switched to the target switching channel, and receive data using the target switching channel.

According to the ZIGBEE network-based data transmission method, apparatus, and system that are provided in the present disclosure, when detecting that a current working channel is interfered, a lower-layer routing node acquires all available switching channels, and reports all the available switching channels to an upper-layer routing node. After receiving a target switching channel specified by the upper-layer routing node for the lower-layer routing node, the lower-layer routing node switches its working channel to the target switching channel, and transmits data using the target switching channel. Compared with the prior art lacking a method for effectively removing interference, in the present disclosure, a node that is interfered is switched to a working channel with relatively small interference, which can effectively reduce interference received by a lower-layer network node, and further can improve a success rate of data transmission.

BRIEF DESCRIPTION OF DRAWINGS

To describe the technical solutions in the embodiments of the present disclosure more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments with reference to the accompanying drawings in the embodiments. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
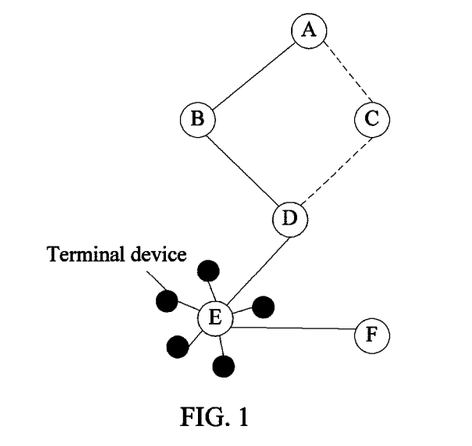
FIG. 1 is a schematic diagram of a topology structure of a ZIGBEE network according to an embodiment of the present disclosure.

To resolve a problem in the prior art that when a ZIGBEE network to which interference is relatively large is used to perform data transmission, a success rate of data transmission is relatively low, an embodiment of the present disclosure provides a ZIGBEE network-based data transmission method. The ZIGBEE network includes one coordinator node and at least one routing node, and at least one terminal device node is connected to each routing node. A dynamic ZIGBEE network is formed between routing nodes in a self-organizing manner, and each node maintains routing information of the entire network in real time, and the nodes communicate according to a routing table. FIG. 1 is a topology diagram of a ZIGBEE network, where a node A is a coordinator, and nodes B, C, D, E, and F are routing nodes. Multiple terminal devices that are used to collect data are wirelessly connected to each routing node. The terminal device may be a water meter, an electricity meter, or the like that has a ZIGBEE module. For example, the figure only shows that five terminal devices are connected to the node E. In addition, the figure further shows multiple communication paths in the network in a period of time. For example, nodes A, B, D, E, and F form a communication path, nodes A, B and D form a communication path, and nodes A, C, and D form another communication path. In addition, a preferred communication path is indicated with a solid line in the figure, and a candidate communication path is indicated with a dashed line. When each node in the ZIGBEE network is working, only one communication path is selected for communication. Because compared with the candidate communication path, the preferred communication path has a smaller delay, a higher transmission speed, and the like, the preferred communication path is preferentially selected in the ZIGBEE network as a current communication path. When communication cannot be normally performed on the preferred communication path, the candidate communication path is then switched to for completing communication. For example, when nodes A and D communicate with each other, the node B is preferentially selected to complete the communication. In this case, the node C does not work. When the node B fails, the node C is then selected to complete the communication.

In addition, an upper/lower layer relationship exists between routing nodes in the ZIGBEE network. An upper-layer routing node and a lower-layer routing node are relative concepts, used to describe an upper/lower layer relationship of two adjacent nodes on a same communication path in a specific network topology structure, related to the working principle of the ZIGBEE network. The ZIGBEE network uses a self-organizing networking manner. According to rules of the ZIGBEE protocol, nodes in the network send a broadcast packet to each other at regular intervals, to learn information, such as working channels of all adjacent nodes in communication ranges of the nodes, and a node, with which each adjacent node can directly communicate, and update a routing table in time. In this way, each node can directly or indirectly establish contact with another node according to the routing table that is updated in time. For two adjacent nodes, a node 1 and a node 2 that can directly communicate with each other, when the node 1 needs to communicate with the coordinator using the node 2, the node 2 is an upper-layer routing node of the node 1. When network topology changes, an upper/lower layer relationship of two adjacent nodes also changes. Therefore, each routing node may be an upper-layer routing node, or may be a lower-layer routing node. In addition, one lower-layer routing node may correspond to multiple upper-layer routing nodes, and one upper-layer routing node may correspond to multiple lower-layer routing nodes. For example, in the topology of the ZIGBEE network shown in FIG. 1, in a communication path including the nodes A, B, D, and E, the node B is an upper-layer routing node of the node D, the node D is a lower-layer routing node of the node B, and the node D is an upper-layer routing node of the node E. In a communication path including the nodes A, C, D, and E, the node C is an upper-layer routing node of the node D, and the node D is a lower-layer routing node of the node C.

Figure 2:
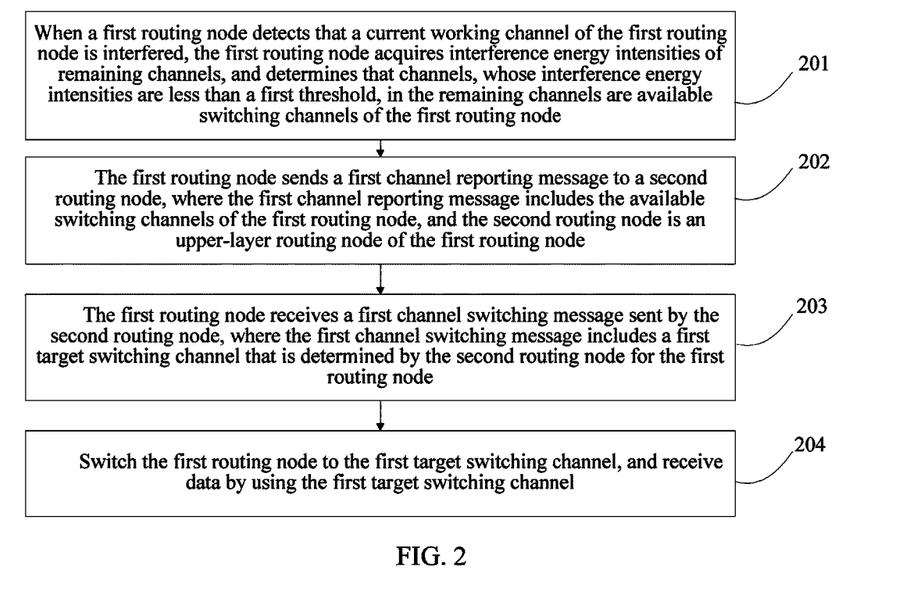
FIG. 2 is a flowchart of a ZIGBEE network-based data transmission method according to an embodiment of the present disclosure.

For ease of description, in this embodiment, a routing node is used as a start point, the routing node is referred to as a first routing node, and an upper-layer routing node of the first routing node is referred to as a second routing node. The first routing node may further have one or more lower-layer routing nodes, for example, multiple lower-layer routing nodes corresponding to the first routing node are separately referred to as a third routing node and a fourth routing node. To sum up, first, second, third, and fourth in this embodiment are used only for ease of description and distinguishing. As shown in FIG. 2, the data transmission method provided in this embodiment of the present disclosure includes the following steps.

Step 201: When the first routing node detects that a current working channel of the first routing node is interfered, the first routing node acquires interference energy intensities of remaining channels, and determines that channels, whose interference energy intensities are less than a first threshold, in the remaining channels are available switching channels of the first routing node.

The remaining channels refer to the other 15 channels in 16 channels specified in the ZIGBEE protocol except the current working channel of the first routing node.

Each node in the ZIGBEE network has an energy scanning function. Therefore, optionally, interference energy of the remaining 15 channels may be detected using the energy scanning function of the first routing node. A larger detected interference energy value of a channel indicates larger interference received by the first routing node when the first routing node works on the channel.

Optionally, a value of the first threshold may be 1 decibel-milliwatt (dBm) to 5 dBm, for example, 1.5 dBm. A specific value of the first threshold differs according to hardware detection circuits of ZIGBEE chips of different manufactures.

In addition, the channel in this embodiment may also be referred to as a frequency band, that is, 2.4 GHz is divided into 16 working frequency bands, and each working frequency band may be referred to as a working channel.

Step 202: The first routing node sends a first channel report message to the second routing node, where the first channel report message includes the available switching channels of the first routing node, and the second routing node is an upper-layer routing node of the first routing node.

Optionally, in an implementation manner of a channel report message, the channel report message is represented using a 16-bit binary digit, for example, a number "1" represents that the channel is an available switching channel, and "0" represents that the channel is not an available switching channel. In addition, the channel report message is encapsulated into a channel reporting packet for sending, and for a packet format of the channel reporting packet, refer to details below.

In addition, in an implementation manner of this step, the first routing node first sends a channel report message to the second routing node according to a network address and a working channel of the second routing node that are provided by a routing table. When a channel switching message (a response message corresponding to the channel report message) of the first routing node is not received, the first routing node finds the second routing node in a channel polling manner, and then sends the channel report message again. For the specific implementation process, refer to details of step 2021 to step 2025.

In another implementation manner of this step, according to the working principle of the ZIGBEE network, at a current moment, a lower-layer routing node communicates with only one upper-layer routing node. Therefore, when one lower-layer routing node corresponds to multiple upper-layer routing nodes, the lower-layer routing node first sends a channel report message to an upper-layer routing node on a preferred path, and when no response message is received, sends the channel report message to an upper-layer routing node on another path with a relatively low priority.

It should be noted that the two implementation manners of this step may be combined with each other.

Step 203: The first routing node receives a first channel switching message sent by the second routing node, where the first channel switching message includes a first target switching channel that is determined by the second routing node for the first routing node.

Because not all channels that are available switching channels for the first routing node are available switching channels for the second routing node, and an upper-layer routing node and a lower-layer routing node need to use a same working channel during communication, when a target switching channel is selected for the first routing node, the second routing node acquires an interference energy intensity of each available switching channel of the first routing node using the energy scanning function, and determines that an available switching channel whose interference energy intensity is the lowest is the target switching channel of the first routing node, that is, selects, from all available switching channels, a channel whose interference to the second routing node is the smallest as the target switching channel of the first routing node.

After selecting the first target switching channel for the first routing node, the second routing node sends a channel switching message including the first target switching channel to the first routing node. In addition, the second routing node updates routing information of the first routing node in a routing table that is maintained by the second routing node.

Step 204: Switch the first routing node to the first target switching channel, and receive data using the first target switching channel.

In the ZIGBEE network, data is transmitted in the network using a packet. Therefore, the data in this step collectively refers to information carried in the packet transmitted in the network, and includes various types of signaling and collected terminal data.

In addition, for a routing node, the data transmission in the present disclosure refers to receiving of data using a channel that is switched to, and when data needs to be sent, the routing node and a receiver need to be on a same working channel, and the same working channel is generally a working channel of the receiver.

It may be seen from the steps shown in FIG. 2 that, because interference received by each node in the ZIGBEE network may be different, and compared with the prior art in which all nodes in a ZIGBEE network have a same working channel, a channel of each node in the network in this embodiment can be switched after each node is interfered, and multiple channels may exist in the ZIGBEE network at the same time in order to reduce interference received by each node as much as possible, and improve a success rate of data transmission.

According to the ZIGBEE network-based data transmission method provided in the present disclosure, when detecting that a current working channel is interfered, a routing node acquires all available switching channels, and reports all the available switching channels to an upper-layer routing node. After receiving a target switching channel specified by the upper-layer routing node, the routing node is switched from the current working channel to the target switching channel, and performs data transmission using a working channel that is switched to. Compared with the prior art lacking a method for effectively removing interference, in the present disclosure, after a routing node is interfered, the routing node is switched to a working channel to which interference is relatively small, which can effectively reduce interference received by the routing node, and further can improve a success rate of data transmission.

Optionally, as an elaboration of step 201 shown in FIG. 2, the first routing node can successively detect interference energy of the remaining 15 channels using the energy scanning function of the first routing node in order to acquire interference energy of each channel, separately compares the acquired interference energy of each channel with the first threshold, and marks a channel whose interference energy is less than the first threshold as an available switching channel (which may also be referred to as an available channel), to obtain all the available switching channels. Alternatively, a comparison method similar to a dichotomy may be used, that is, after the interference energy of the 15 channels is detected, interference energy values are arranged in an order of values to form an original sequence, a median of the original sequence is selected and is compared with the first threshold. When a comparison result is that the median is less than the first threshold, channels that correspond to interference energy values less than the median in the original sequence are all marked as available switching channels, then other interference energy values that are greater than the median in the original sequence form a new sequence, a median of the new sequence is selected and is then compared with the first threshold again, and the foregoing process is repeated. Similarly, when the median of the original sequence is greater than the first threshold, channels that correspond to interference energy values greater than the median are all marked as unavailable channels, and interference energy values in the original sequence that are less than the median and that are arranged in an order of values form a new sequence, and the foregoing steps are repeated.

As an elaboration of step 201 shown in FIG. 2, detecting, by a first routing node, that a current working channel of the first routing node is interfered includes comparing, by the first routing node, a data reading success rate with a second threshold, and when the data reading success rate is less than the second threshold, acquiring an interference energy intensity of the current working channel, where if the interference energy intensity is greater than a third threshold, the current working channel is interfered.

Furthermore, the data reading success rate refers to a ratio of a quantity of messages received by the first routing node to a quantity of messages sent by the first routing node within a preset time. For example, when a node sends 10 messages and receives eight messages within a period of time, a data reading success rate corresponding to the node is 80%. In addition, when the ZIGBEE network is applied to a meter reading system, the data reading success rate in this step may also be referred to as a one-time meter reading success rate.

In addition, a value of the second threshold may be a value, such as 50% or 60%, and may be determined according to an actual network.

It should be noted that, the first routing node may collect statistics about and perform comparison on data reading success rates at regular intervals, for example, 30 second (s), or each time data reading needs to be performed, may collect statistics about the data reading success rates or read a data reading success rate calculated after data is sent last time. For example, when a coordinator A needs to query data of an area D, the coordinator acquires the data of the area D using preferred paths A, C, and D, A sends a query packet to C, and after receiving the query packet, C collects statistics about data reading success rates. Similarly, after receiving the query packet of the node C, the node D collects statistics about data reading success rates. When D reversely returns data to A after reading the data, each node also needs to collect statistics about data reading success rates and compare the data reading success rates with the second threshold. When the ZIGBEE network is applied to the meter reading system, a last-time meter reading success rate of the node may also be read each time data reading needs to be performed.

Optionally, the third threshold may be 1 dBm to 5 dBm, for example, 2.5 dBm. It should be noted that a value of the third threshold may be the same as the first threshold when it is detected whether a channel is an available switching channel.

Optionally, as an elaboration of step 202 shown in FIG. 2, the first routing node sends the channel report message to the upper-layer routing node using a channel reporting packet, and a format of the channel reporting packet is shown in Table 1 below.

TABLE 1

| Start bit | Version | Data bit length | Command bit | Network address | Data |
|---|---|---|---|---|---|
| 5A5A5A5A | 01 | 0002 | 03 | 0x0012 | 0xff 0x00 |

The start bit refers to a start bit of a packet, and is used to notify a receiving device that data transmission starts, and to notify the receiving device to prepare for receiving data. The version refers to a version number 01 of software running in a current device. The data bit length refers to a size of data carried in the packet, for example, "0002" in the foregoing packet indicates that a length of data carried this time is two bytes. The command bit refers to a type of the packet, and a role of a message carried in the packet can be known according to the command bit, for example, when the command bit is "00", it indicates that a channel is started. When the command bit is "01", it indicates that channel detection is requested to be started. When the command bit is "02", it indicates that the second routing node specifies a new channel for the first routing node, and when the command bit is "03", it indicates that the first routing node reports all available switching channels. The network address refers to a 16-bit short network address of the ZIGBEE network in which the first routing node is located, and a short network address of each node is unique. When the command bit is "03", data corresponding to the command bit is information about whether each channel is an available switching channel. An available switching channel corresponds to "0", and a channel that is not an available switching channel corresponds to "1". Therefore, for example, a binary digit corresponding to "0xFF0x00" in the foregoing packet is 1111111100000000, which indicates that only channels 1 to 8 are available switching channels, and channels 9 to 16 are not available switching channels.

Optionally, as an elaboration of step 202 shown in FIG. 2, in an implementation manner of step 202 of "sending, by the first routing node, a first channel report message to a second routing node", this step further includes the following steps.

Step 2021: The first routing node queries a routing table, and acquires a network address and a working channel of the second routing node.

Information in a routing table maintained by each node in the ZIGBEE network includes network addresses and working channels of all nodes in the ZIGBEE network.

Step 2022: Switch the first routing node to the working channel of the second routing node, and send the first channel report message to the second routing node according to the network address of the second routing node.

If a channel switching message of the second routing node is received, step 202 is completed, and step 203 is performed. If the channel switching message is not received, the working channel of the second routing node may have changed, but the routing table is not updated. Therefore, step 2023 is performed, and the second routing node is found in a channel polling manner.

Step 2023: If the first channel switching message is not received after preset duration, the first routing node sends a search message using each channel, where the search message includes a network address and a working channel of the first routing node such that the second routing node returns a search response message according to the network address and the working channel of the first routing node.

The search message carries the network address of the second routing node, and the network address and the working channel of the first routing node. After another node in the ZIGBEE network receives the search message, a network address of another node is compared with the network address of the second routing node that is carried in the search message. If the network address of the other node is the same as the network address of the second routing node, it indicates that the node is an upper-layer routing node (second routing node) of the first routing node. Therefore, the second routing node obtains the network address and the working channel of the first routing node using the search message, is switched to the working channel of the first routing node, and returns the search response message to the first routing node according to the network address of the first routing node, where the search response message includes a current working channel of the second routing node.

If the search response message of the second routing node is still not received in the channel polling manner in this step, the second routing node fails. The first routing node needs to establish contact with another upper-layer routing node.

If the search response message of the second routing node is received in the channel polling manner, step 2024 and step 2025 are performed.

Step 2024: When the search response message returned by the second routing node is received, the first routing node acquires a current working channel of the second routing node from the search response message.

Step 2025: Switch the first routing node to the current working channel of the second routing node, and send the first channel report message to the second routing node again.

Optionally, as an elaboration of step 202 shown in FIG. 2, in another implementation manner of step 202 of "sending, by the first routing node, a first channel report message to a second routing node", when the first routing node corresponds to multiple upper-layer routing nodes on paths with different priorities, the first routing node first sends a channel report message to an upper-layer routing node on a path with the highest priority. When an upper-layer routing node with a relatively high priority fails, sends the channel report message to an upper-layer routing node with a relatively low priority. That a node fails refers to that a node cannot work normally, and when another node repeatedly sends packets to a node, but no response message of the node is ever received, it may be considered that the node fails. For example, in FIG. 1, a path including nodes A, B, and D is a preferred path. A path including nodes A, C, and D is a candidate path, and a priority of the preferred path is higher than that of the candidate path. Therefore, the node D first sends the channel report message to the node B, and when the node B fails, sends the channel report message to the node C.

It should be noted that the foregoing two implementation manners of step 202 may be combined, that is, when the first routing node corresponds to multiple upper-layer routing nodes, the first routing node first establishes contact with an upper-layer routing node on the preferred path using the method shown in the foregoing step 2021 to step 2025 and sends the channel report message. When the upper-layer routing node on the preferred path fails, establishes contact with an upper-layer routing node on another path using the same method shown in the foregoing step 2021 to step 2025 to send the channel report message. For example, in FIG. 1, the node D corresponds to an upper-layer routing node B on the preferred path and an upper-layer routing node C on the candidate path. Therefore, D first sends the channel report message to the node B according to the information in the routing table, and if the channel switching message is not received, establishes contact with B in the channel polling manner, and if the channel switching message is still not received (the node B may fail), establishes contact with C using the same method.

Optionally, as an elaboration of step 203 shown in FIG. 2, after receiving the channel reporting packet that is described in Table 1 and that is sent by the first routing node, the second routing node may acquire the available switching channels of the first routing node by checking the command bit and carried data, determine the first target switching channel for the first routing node, and send the channel switching message including the first target switching channel to the first routing node. The channel switching message is encapsulated into the channel switching packet for sending, and a format of the channel switching packet is shown in Table 2.

TABLE 2

| Start bit | Version | Data bit length | Command bit | Network address | Data |
|---|---|---|---|---|---|
| 5A5A5A5A | 01 | 0001 | 02 | 0x0012 | 0x02 |

In this packet, for a meaning of each field, refer to the foregoing explanations. In this packet, a value of a "command bit" field is "02", indicating that the second routing node specifies a new channel for the first routing node, data "0x02" indicates that a specified target switching channel is a channel 2.

Optionally, as a supplement to the method shown in FIG. 2, because nodes of the ZIGBEE network may use different working channels, after step 205 of "switching the first routing node to the first target switching channel", the first routing node further needs to notify, in the channel polling manner, another node in the network of the first target switching channel to which the first routing node is switched. Furthermore, the first routing node separately sends a broadcast message using each channel, where the broadcast message is used to notify another node in the ZIGBEE network that the current working channel of the first routing node is the first target switching channel.

Figure 3:
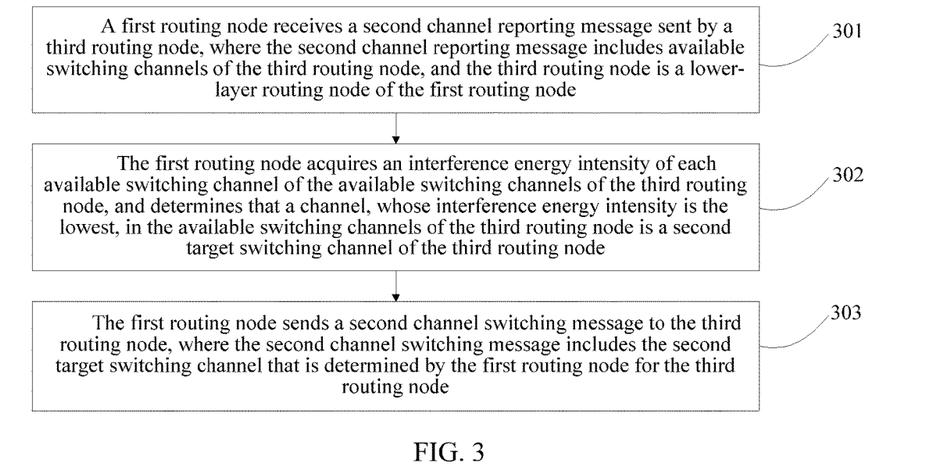
FIG. 3 is a flowchart of another ZIGBEE network-based data transmission method according to an embodiment of the present disclosure.

As a supplement to the method shown in the foregoing figures, as shown in FIG. 3, the method further includes the following steps.

Step 301: The first routing node receives a second channel report message sent by a third routing node, where the second channel report message includes available switching channels of the third routing node, and the third routing node is a lower-layer routing node of the first routing node.

Step 302: The first routing node acquires an interference energy intensity of each available switching channel of the available switching channels of the third routing node, and determines that a channel, whose interference energy intensity is the lowest, in the available switching channels of the third routing node is a second target switching channel of the third routing node.

In this step, after receiving the channel report message sent by the third routing node, the first routing node selects, from all the available switching channels of the third routing node, a channel to which interference is relatively small for the first routing node. In this way, when the first routing node communicates with the third routing node, interference of the used channel to both the first routing node and the third routing node is relatively small, which can improve a success rate of data transmission.

In a specific implementation process of this step, when the first routing node receives channel report messages of at least two lower-layer routing nodes, a channel whose interference to the first routing node and all lower-layer routing nodes in the at least two lower-layer routing nodes is relatively small is used as a target switching channel of each lower-layer routing node. The first routing node receives channel report messages of two lower-layer routing nodes, the third routing node and a fourth routing node, and furthermore, a specific implementation process of this step is as follows. When the first routing node further receives a third channel report message of the fourth routing node, and common available channels that are the same as the available switching channels of the third routing node exist in available switching channels of the fourth routing node that are included in the third channel report message, acquiring interference energy intensities of the common available channels, and determining that a channel, whose interference energy intensity is the lowest, in the common available channels is the second target switching channel of the third routing node and a third target switching channel of the fourth routing node.

Such an implementation manner of this step enables nodes in the ZIGBEE network to use a same channel as much as possible, thereby reducing delays caused by frequent channel switching when data is received and sent, and the like.

Step 303: The first routing node sends a second channel switching message to the third routing node, where the second channel switching message includes the second target switching channel that is determined by the first routing node for the third routing node.

In a specific implementation process of this step, the first routing node first sends a channel switching message to the third routing node according to the information in the routing table, and when no response message of the third routing node is received, establishes contact with the third routing node in the channel polling manner. For a specific implementation process thereof, reference may be made to steps 2021 to 2024, and details are not described herein again.

Figure 4:
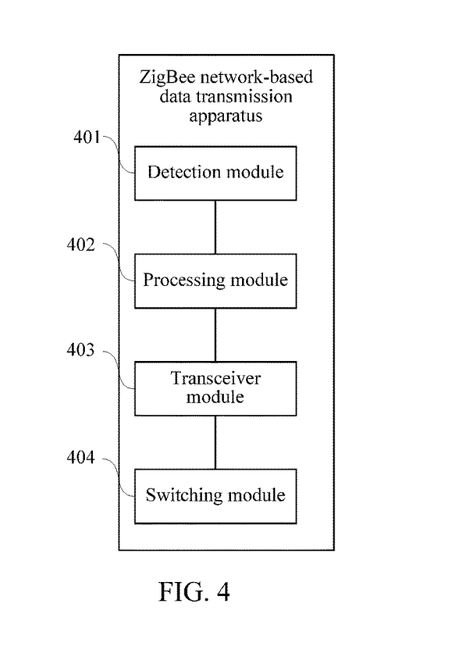
FIG. 4 is a schematic structural diagram of a ZIGBEE network-based data transmission apparatus according to an embodiment of the present disclosure.

As an implementation of and a supplement to the methods shown in the foregoing figures, the present disclosure further provides a ZIGBEE network-based data transmission apparatus. As shown in FIG. 4, the apparatus includes a detection module 401 configured to detect whether a current working channel of a first routing node is interfered, a processing module 402 configured to, when the detection module 401 detects that the current working channel of the first routing node is interfered, acquire interference energy intensities of remaining channels, and determine that channels, whose interference energy intensities are less than a first threshold, in the remaining channels are available switching channels of the first routing node, a transceiver module 403 configured to send a first channel report message to a second routing node, where the first channel report message includes the available switching channels of the first routing node that are determined by the processing module 402, and the second routing node is an upper-layer routing node of the first routing node, and receive a first channel switching message sent by the second routing node, where the first channel switching message includes a first target switching channel that is determined by the second routing node for the first routing node, and a switching module 404 configured to switch the first routing node to the first target switching channel, where the transceiver module 403 is further configured to receive data using the first target switching channel that is switched to by the switching module 404.

The transceiver module 403 is further configured to query a routing table, and acquire a network address and a working channel of the second routing node, and switch the first routing node to the working channel of the second routing node, and send the first channel report message to the second routing node according to the network address of the second routing node.

The transceiver module 403 is further configured to, when the first channel switching message is not received after preset duration, send a search message using each channel, where the search message includes a network address and a working channel of the first routing node such that the second routing node returns a search response message according to the network address and the working channel of the first routing node, when the search response message returned by the second routing node is received, acquire a current working channel of the second routing node from the search response message, and switch the first routing node to the current working channel of the second routing node, and send the first channel report message to the second routing node again.

The transceiver module 403 is further configured to receive a second channel report message sent by a third routing node, where the second channel report message includes available switching channels of the third routing node, and the third routing node is a lower-layer routing node of the first routing node. The processing module 402 is further configured to acquire an interference energy intensity of each available switching channel of the available switching channels of the third routing node, and determine that a channel, whose interference energy intensity is the lowest, in the available switching channels of the third routing node is a second target switching channel of the third routing node, and the transceiver module 403 is further configured to send a second channel switching message to the third routing node, where the second channel switching message includes the second target switching channel that is determined by the first routing node for the third routing node.

The processing module 402 is further configured to, when a third channel report message of a fourth routing node is received, and common available channels that are the same as the available switching channels of the third routing node exist in available switching channels of the fourth routing node that are included in the third channel report message, acquire interference energy intensities of the common available channels, and determine that a channel, whose interference energy intensity is the lowest, in the common available channels is the second target switching channel of the third routing node.

According to the ZIGBEE network-based data transmission apparatus provided in the present disclosure, when detecting that a current working channel is interfered, a routing node acquires all available switching channels, and reports all the available switching channels to an upper-layer routing node. After receiving a target switching channel specified by the upper-layer routing node, the routing node is switched from the current working channel to the target switching channel, and performs data transmission using a working channel that is switched to. Compared with the prior art lacking a method for effectively removing interference, in the present disclosure, after a routing node is interfered, the routing node is switched to a working channel to which interference is relatively small, which can effectively reduce interference received by the routing node, and further can improve a success rate of data transmission.

Figure 5:
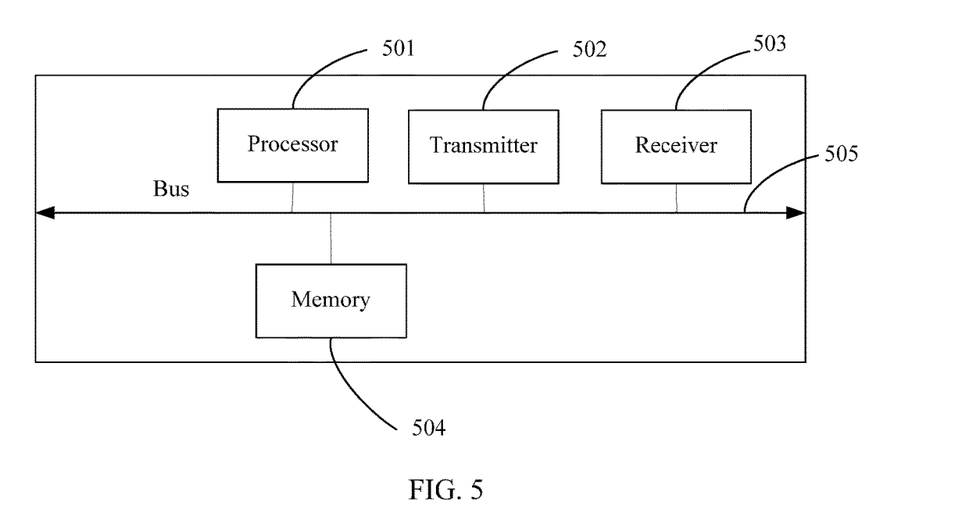
FIG. 5 is a schematic structural diagram of another ZIGBEE network-based data transmission apparatus according to an embodiment of the present disclosure.

As an implementation of the methods shown in the foregoing figures, the present disclosure further provides a ZIGBEE network-based data transmission apparatus. As shown in FIG. 5, the apparatus includes a processor 501, a transmitter 502, a receiver 503, a memory 504, and a bus 505. The processor 501, the transmitter 502, the receiver 503, and the memory 504 are connected using the bus 505.

The processor 501 is configured to detect whether a current working channel of a first routing node is interfered, and when detecting that the current working channel of the first routing node is interfered, acquire interference energy intensities of remaining channels, determine that channels, whose interference energy intensities are less than a first threshold, in the remaining channels are available switching channels of the first routing node, and store the available switching channels in the memory 504.

The transmitter 502 is configured to send a first channel report message to a second routing node, where the first channel report message includes the available switching channels of the first routing node that are stored in the memory 504, and the second routing node is an upper-layer routing node of the first routing node.

The receiver 503 is configured to receive a first channel switching message sent by the second routing node, where the first channel switching message includes a first target switching channel that is determined by the second routing node for the first routing node.

The processor 501 is further configured to switch the first routing node to the first target switching channel.

The receiver 503 is further configured to receive data using the first target switching channel.

The processor 501 is further configured to query a routing table, acquire a network address and a working channel of the second routing node, and switch the first routing node to the working channel of the second routing node.

The transmitter 502 is further configured to send the first channel report message to the second routing node according to the network address of the second routing node.

The transmitter 502 is further configured to, when the first channel switching message is not received after preset duration, send a search message using each channel, where the search message includes a network address and a working channel of the first routing node such that the second routing node returns a search response message according to the network address and the working channel of the first routing node. The processor 501 is further configured to, when the search response message returned by the second routing node is received, acquire a current working channel of the second routing node from the search response message, and switch the first routing node to the current working channel of the second routing node, and the transmitter 502 is further configured to send the first channel report message to the second routing node again.

The receiver 503 is further configured to receive a second channel report message sent by a third routing node, where the second channel report message includes available switching channels of the third routing node, and store the available switching channels of the third routing node in the memory 504, where the third routing node is a lower-layer routing node of the first routing node.

The processor 501 is further configured to acquire an interference energy intensity of each available switching channel of the available switching channels of the third routing node that are stored in the memory 504, and determine that a channel, whose interference energy intensity is the lowest, in the available switching channels of the third routing node is a second target switching channel of the third routing node.

The transmitter 502 is further configured to send a second channel switching message to the third routing node, where the second channel switching message includes the second target switching channel that is determined by the first routing node for the third routing node.

The processor 501 is further configured to, when a third channel report message of a fourth routing node is received, and common available channels that are the same as the available switching channels of the third routing node exist in available switching channels of the fourth routing node that are included in the third channel report message, acquire interference energy intensities of the common available channels, and determine that a channel, whose interference energy intensity is the lowest, in the common available channels is the second target switching channel of the third routing node.

It should be noted that the processor 501 described in this embodiment of the present disclosure may be one processor, or may collectively refer to multiple processing elements. For example, the processor 501 may be a central processing unit (CPU), or may be an application specific integrated circuit (ASIC), or is configured as one or more integrated circuits for implementing this embodiment of the present disclosure, for example, one or more microprocessors (digital signal processor (DSP)) or one or more field programmable gate arrays (FPGA).

The memory 504 may be one storage apparatus, or may collectively refer to multiple storage elements, and is configured to store executable program code. In addition, the memory 504 may include a random access memory (RAM), or may include a non-volatile memory, for example, a magnetic disk storage or a flash memory.

The bus 505 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of indication, the bus in FIG. 5 is represented using only one bold line, but it does not indicate that there is only one bus or one type of bus.

According to the ZIGBEE network-based data transmission apparatus provided in the present disclosure, when detecting that a current working channel is interfered, a routing node acquires all available switching channels, and reports all the available switching channels to an upper-layer routing node. After receiving a target switching channel specified by the upper-layer routing node, the routing node is switched from the current working channel to the target switching channel, and performs data transmission using a working channel that is switched to. Compared with the prior art lacking a method for effectively removing interference, in the present disclosure, after a routing node is interfered, the routing node is switched to a working channel to which interference is relatively small, which can effectively reduce interference received by the routing node, and further can improve a success rate of data transmission.

Figure 6:
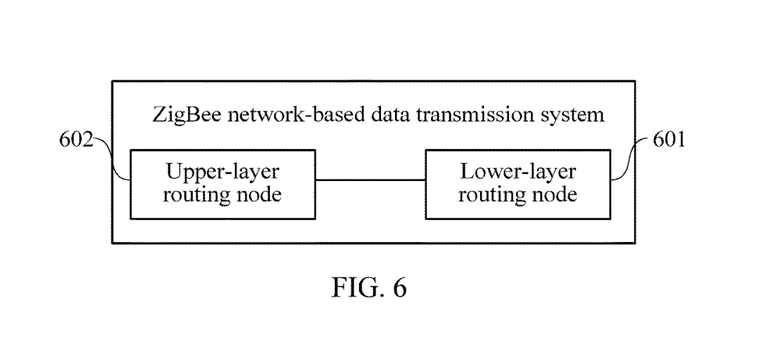
FIG. 6 is a schematic structural diagram of a ZIGBEE network-based data transmission system according to an embodiment of the present disclosure.

As implementation and applications of the method and apparatuses that are shown in the foregoing figures, as shown in FIG. 6, this embodiment further provides a ZIGBEE network-based data transmission system. The system includes a lower-layer routing node 601 and an upper-layer routing node 602, where the lower-layer routing node 601 is configured to, when detecting that a current working channel is interfered, acquire interference energy intensities of remaining channels, and determine that channels, whose interference energy intensities are less than a first threshold, in the remaining channels are available switching channels of the lower-layer routing node 601, and send a channel report message to the upper-layer routing node 602, where the channel report message includes the available switching channels of the lower-layer routing node. The upper-layer routing node 602 is configured to receive the channel report message, acquire an interference energy intensity of each available switching channel of the available switching channels of the lower-layer routing node, and determine that a channel, whose interference energy intensity is the lowest, in the available switching channels of the lower-layer routing node is a target switching channel of the lower-layer routing node, and send a channel switching message to the lower-layer routing node 601, where the channel switching message includes the target switching channel that is determined by the upper-layer routing node 602 for the lower-layer routing node 601, and the lower-layer routing node 601 is further configured to receive the channel switching message, be switched to the target switching channel, and receive data using the target switching channel.

Figure 7:
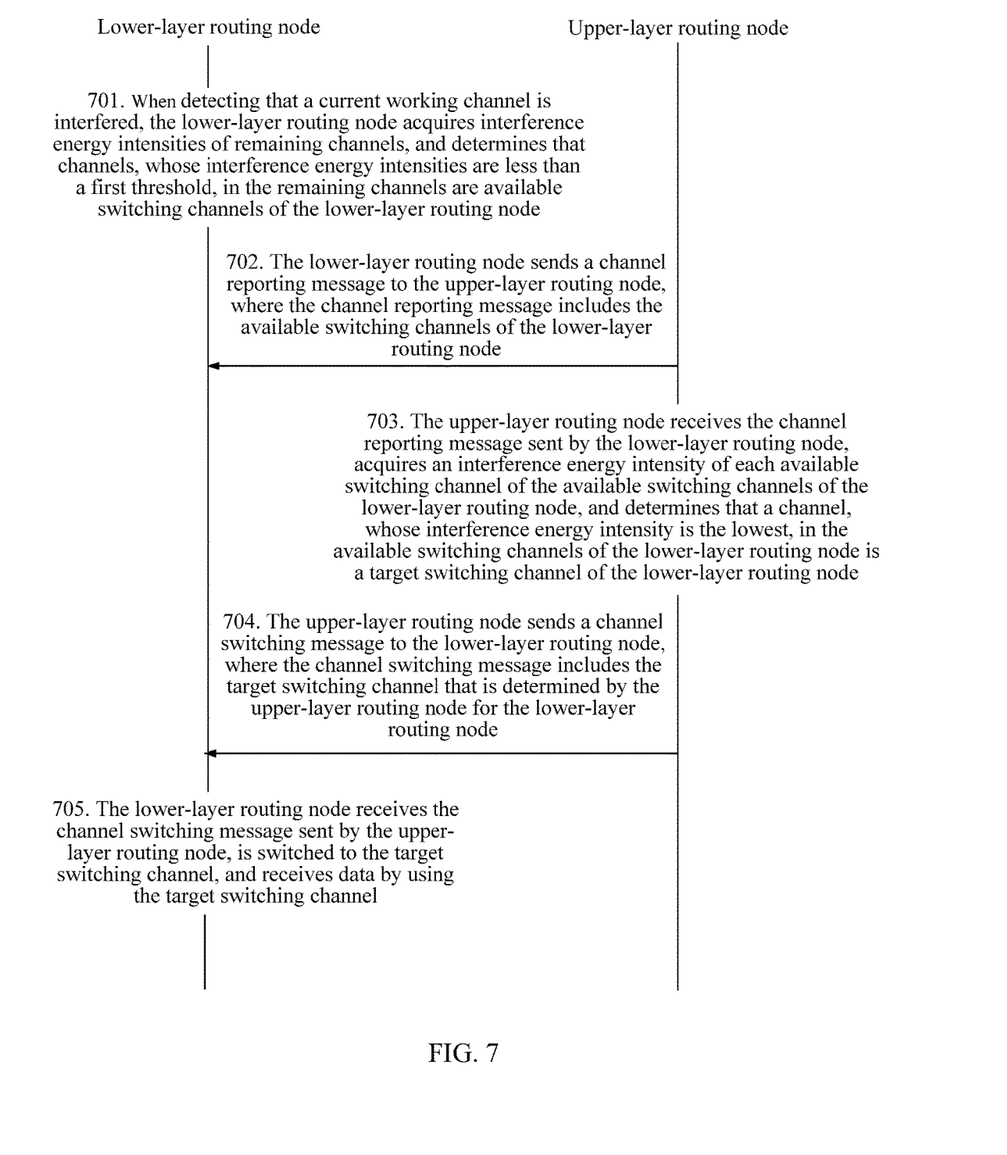
FIG. 7 is a flowchart of interaction between an upper-layer routing node and a lower-layer routing node that are in a ZIGBEE network-based data transmission system according to an embodiment of the present disclosure.

FIG. 7 is a flowchart of interaction between an upper-layer routing node and a lower-layer routing node that are in the ZIGBEE network-based data transmission system, and the process includes the following steps.

Step 701: When detecting that a current working channel is interfered, a lower-layer routing node acquires interference energy intensities of remaining channels, and determines that channels, whose interference energy intensities are less than a first threshold, in the remaining channels are available switching channels of the lower-layer routing node.

Step 702: The lower-layer routing node sends a channel report message to an upper-layer routing node, where the channel report message includes the available switching channels of the lower-layer routing node.

Step 703: The upper-layer routing node receives the channel report message sent by the lower-layer routing node, acquires an interference energy intensity of each available switching channel of the available switching channels of the lower-layer routing node, and determines that a channel, whose interference energy intensity is the lowest, in the available switching channels of the lower-layer routing node is a target switching channel of the lower-layer routing node.

Step 704: The upper-layer routing node sends a channel switching message to the lower-layer routing node, where the channel switching message includes the target switching channel that is determined by the upper-layer routing node for the lower-layer routing node.

Step 705: The lower-layer routing node receives the channel switching message sent by the upper-layer routing node, is switched to the target switching channel, and receives data using the target switching channel.

According to the ZIGBEE network-based data transmission system provided in the present disclosure, when detecting that a current working channel is interfered, a lower-layer routing node acquires all available switching channels, and reports all the available switching channels to an upper-layer routing node. The upper-layer routing node detects interference energy of all the available switching channels, determines that a channel whose interference energy is the smallest is a target switching channel of the lower-layer routing node, and sends a channel switching message to the lower-layer routing node. After receiving the channel switching message of the upper-layer routing node, the lower-layer routing node is switched from the current working channel to the target switching channel indicated by the channel switching message, and performs data transmission using a working channel that is switched to. Compared with the prior art lacking a method for effectively removing interference, in the present disclosure, a routing node that is interfered is switched to a working channel to which interference is relatively small, which can effectively reduce interference received by the routing node, and further can improve a success rate of data transmission.

Based on the foregoing descriptions of the implementation manners, a person skilled in the art may clearly understand that the present disclosure may be implemented by software in addition to necessary universal hardware or by hardware only. In most circumstances, the former is a preferred implementation manner. Based on such an understanding, the technical solutions of the present disclosure essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the method described in the embodiments of the present disclosure.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:

1. A ZIGBEE network-based data transmission method, comprising:
   acquiring, by a first routing node, interference energy intensities of remaining channels when the first routing node detects that a current working channel of the first routing node is interfered;
   determining that the channels, whose interference energy intensities are less than a first threshold, in the remaining channels are available switching channels of the first routing node;
   sending, by the first routing node, a first channel report message to a second routing node, wherein the first channel report message comprises the available switching channels of the first routing node, and wherein the second routing node is an upper-layer routing node of the first routing node;
   switching the current working channel of the first routing node to a first target switching channel when a first channel switching message is received from the second routing node, wherein the first channel switching message comprises the first target switching channel that is determined by the second routing node for the first routing node;
   receiving data using the first target switching channel;
   sending, by the first routing node, a search message using each channel when the first channel switching message is not received after preset duration, wherein the search message comprises a network address and a working channel of the first routing node;
   acquiring, by the first routing node, a current working channel of the second routing node from a search response message when the search response message is received from the second routing node;
   switching the current working channel of the first routing node to the current working channel of the second routing node; and
   sending the first channel report message to the second routing node again.

2. The method according to claim 1, wherein sending, by the first routing node, the first channel report message to the second routing node comprises:
   querying, by the first routing node, a routing table;
   acquiring, by the first routing node, a network address and a working channel of the second routing node;
   switching the current working channel of the first routing node to the working channel of the second routing node; and
   sending the first channel report message to the second muting node according to the network address of the second routing node.

3. The method according to claim 1, wherein detecting, by the first routing node, that the current working channel of the first routing node is interfered comprises:
   comparing, by the first routing node, a data reading success rate with a second threshold; and
   acquiring an interference energy intensity of the current working channel when the data reading success rate is less than the second threshold,
   wherein when the interference energy intensity is greater than a third threshold, the current working channel is interfered, and
   wherein the data reading success rate is a ratio of a quantity of messages received by the first routing node to a quantity of messages sent by the first routing node within a preset time.

4. The method according to claim 1, further comprising:
   receiving, by the first routing node, a second channel report message from a third routing node, wherein the second channel report message comprises available switching channels of the third routing node, and wherein the third routing node is a lower-layer routing node of the first routing node;
   acquiring, by the first routing node, an interference energy intensity of each available switching channel of the available switching channels of the third routing node;
   determining, by the first routing node, that a channel, whose interference energy intensity is the lowest, in the available switching channels of the third routing node is a second target switching channel of the third routing node; and
   sending, by the first routing node, a second channel switching message to the third routing node, wherein the second channel switching message comprises the second target switching channel that is determined by the first routing node for the third routing node.

5. The method according to claim 4, wherein acquiring, by the first routing node, the interference energy intensity of each available switching channel of the available switching channels of the third routing node, and wherein determining that the channel, whose interference energy intensity is the lowest, in the available switching channels of the third routing node is the second target switching channel of the third routing node comprises:
   acquiring interference energy intensities of common available channels when the first routing node receives a third channel report message of a fourth routing node, wherein the third channel report message comprises information of the common available channels, wherein the common available channels are those channels that exist in both the available switching channels of the third routing node and available switching channels of the fourth routing node; and
   determining that the channel, whose interference energy intensity is the lowest, in the common available channels is the second target switching channel of the third routing node.

6. A ZIGBEE network-based data transmission apparatus, comprising:
   a detector configured to detect whether a current working channel of a first routing node is interfered;
   a processor coupled to the detector and configured to:
      acquire interference energy intensities of remaining channels when it is detected that the current working channel of the first routing node is interfered; and
      determine that the channels, whose interference energy intensities are less than a first threshold, in the remaining channels are available switching channels of the first routing node;
   a transceiver coupled to the processor and configured to:
      send a first channel report message to a second routing node, wherein the first channel report message comprises the available switching channels of the first routing node, and wherein the second routing node is an upper-layer routing node of the first routing node;
      receive a first channel switching message from the second routing node, wherein the first channel switching message comprises a first target switching channel that is determined by the second routing node for the first routing node; and receive data using the first target switching channel; and a switch coupled to the transceiver and configured to switch the current working channel of the first routing node to the first target switching channel when the first channel switching message is received, wherein when the first channel switching message is not received after a preset duration, the transceiver is further configured to:
send a search message using each channel, wherein the search message comprises a network address and a working channel of the first routing node;
acquire a current working channel of the second routing node from a search response message when the search response message is received from the second routing node; and
send the first channel report message to the second routing node after the current working channel of the first routing node is switched to the current working channel of the second routing node, and
wherein the switch is further configured to switch the current working channel of the first routing node to the current working channel of the second routing node.

7. The ZIGBEE network-based data transmission apparatus according to claim 6, wherein the transceiver is further configured to:
query a routing table;
acquire a network address and a working channel of the second routing node;
switch the current working channel of the first routing node to the working channel of the second routing node; and
send the first channel report message to the second routing node according to the network address of the second routing node.

8. The ZIGBEE network-based data transmission apparatus according to claim 6, wherein the transceiver is further configured to receive a second channel report message from a third routing node, wherein the second channel report message comprises available switching channels of the third routing node, wherein the third routing node is a lower-layer routing node of the first routing node, wherein the processor is further configured to:
acquire an interference energy intensity of each available switching channel of the available switching channels of the third routing node; and
determine that a channel, whose interference energy intensity is the lowest, in the available switching channels of the third routing node is a second target switching channel of the third routing node, and
wherein the transceiver is further configured to send a second channel switching message to the third routing node, and
wherein the second channel switching message comprises the second target switching channel that is determined by the processor for the third routing node.

9. The ZIGBEE network-based data transmission apparatus according to claim 8, wherein the processor is further configured to:
acquire interference energy intensities of common available channels when a third channel report message of a fourth routing node is received, wherein the third channel report message comprises information of the common available channels, wherein the common available channels are those channels that exist in both the available switching channels of the third routing node and available switching channels of the fourth routing node; and
determine that the channel, whose interference energy intensity is the lowest, in the common available channels is the second target switching channel of the third routing node.

10. A ZIGBEE network-based data transmission system, comprising:
an upper-layer routing node; and
a lower-layer routing node coupled to the upper-layer routing node,
wherein the lower-layer routing node is configured to:
acquire interference energy intensities of remaining channels when detecting that a current working channel is interfered;
determine that the channels, whose interference energy intensities are less than a first threshold, in the remaining channels are available switching channels of the lower-layer routing node;
send a channel report message to the upper-layer routing node, wherein the channel report message comprises the available switching channels of the lower-layer routing node;
switch the current working channel of the lower-layer routing node to a first target switching channel when a channel switching message is received from the upper-layer routing node, wherein the channel switching message comprises information of the first target switching channel that is determined by the upper-layer routing node for the lower-layer routing node, and receive data using the first target switching channel;
send a search message using each channel when the first channel switching message is not received after preset duration, wherein the search message comprises a network address and a working channel of the lower-layer routing node;
acquire a current working channel of the upper-layer routing node from a search response message when the search response message is received from the second routing node;
switch the current work channel of the lower-layer routing node to the current working channel of the upper-layer routing node; and
send the channel report message to the second routing node after the current working channel of the first routing node is switched to the current working channel of the second routing node,
wherein the upper-layer routing node is configured to:
receive the channel report message;
acquire an interference energy intensity of each available switching channel of the available switching channels of the lower-layer routing node;
determine that a channel, whose interference energy intensity is the lowest, in the available switching channels of the lower-layer routing node is a target switching channel of the lower-layer routing node; and
send a channel switching message to the lower-layer routing node, and
wherein the channel switching message comprises the target switching channel that is determined by the upper-layer routing node for the lower-layer routing node.

11. A ZIGBEE network-based data transmission apparatus comprising:
- a processor;
- a transmitter;
- a receiver;
- a memory; and
- a bus,
- wherein the processor, the transmitter, the receiver, and the memory are coupled using the bus,
- wherein the processor is configured to:
  - detect whether a current working channel of a first routing node is interfered;
  - acquire interference energy intensities of remaining channels when the current working channel of the first routing node is interfered;
  - determine that channels, whose interference energy intensities are less than a first threshold, in the remaining channels are available switching channels of the first routing node;
  - store information of available switching channels in the memory; and
  - switch the current working channel of the first routing node to a first target switching channel when a first channel switching message is received, wherein the first channel switching message includes the first target switching channel that is determined by the second routing node for the first routing node
- wherein the transmitter is configured to send a first channel report message to a second routing node, wherein the first channel report message includes the information of available switching channels of the first routing node that is stored in the memory, and wherein the second routing node is an upper-layer routing node of the first routing node,
- wherein the receiver is configured to:
  - receive the first channel switching message from the second routing node; and
  - receive data using the first target switching channel,
- wherein when the first channel switching message is not received after a preset duration, the transmitter is further configured to:
  - send a search message using each channel, wherein the search message includes a network address and a working channel of the first routing node;
  - send the first channel report message to the second routing node after the current working channel of the first routing node is switched to the current working channel of the second routing node, and
- wherein the processor is further configured to:
  - acquire a current working channel of the second routing node from a search response message; and
  - switch the current working channel of the first routing node to the current working channel of the second routing node.

12. The ZIGBEE network-based data transmission apparatus according claim 11, wherein the processor is further configured to:
- query a routing table;
- acquire a network address and a working channel of the second routing node; and
- switch the current working channel of the first routing node to the working channel of the second routing node, and
- wherein the transmitter is further configured to send the first channel report message to the second routing node according to the network address of the second routing node.

13. The ZIGBEE network-based data transmission apparatus according to claim 11, wherein the receiver is further configured to:
- receive a second channel report message from a third routing node, wherein the second channel report message includes information of available switching channels of the third routing node; and
- store the information of the available switching channels of the third routing node in the memory,
- wherein the third routing node is a lower-layer routing node of the first routing node,
- wherein the processor is further configured to:
  - acquire an interference energy intensity of each of the available switching channels of the third routing node; and
  - determine that a channel, whose interference energy intensity is the lowest, in the available switching channels of the third routing node is a second target switching channel of the third routing node,
- wherein the transmitter is further configured to send a second channel switching message to the third routing node, and
- wherein the second channel switching message includes the second target switching channel that is determined by the first routing node for the third routing node.

14. The ZIGBEE network-based data transmission apparatus according to claim 12, wherein the processor is further configured to:
- acquire interference energy intensities of common available channels when a third channel report message of a fourth routing node is received, wherein the third channel report message comprises information of the common available channels, and wherein the common available channels are those channels that exist in both the available switching channels of the third routing node and available switching channels of the fourth routing node; and
- determine that a channel, whose interference energy intensity is the lowest, in the common available channels is the second target switching channel of the third routing node.

* * * * *